United States Patent [19]

Na et al.

[11] Patent Number: 5,750,457

[45] Date of Patent: May 12, 1998

[54] SOLID ACID CATALYST FOR PARAFFIN CONVERSION AND PROCESS FOR PARAFFIN CONVERSION USING THE SAME

[75] Inventors: Kyutae Na, Mitaka; Toshio Okuhara, Chiba; Makoto Misono, Tokyo, all of Japan

[73] Assignee: Nippon Oil Company, Ltd., Tokyo, Japan

[21] Appl. No.: 509,299

[22] Filed: Jul. 31, 1995

Related U.S. Application Data

[63] Continuation-in-part of Ser. No. 215,947, Mar. 22, 1994, abandoned.

[30] Foreign Application Priority Data

Mar. 26, 1994 [JP] Japan ................................ 5-092125

[51] Int. Cl.$^6$ ................... C07D 401/00; C01B 25/00; C07C 5/13; B01J 27/188
[52] U.S. Cl. ................... 502/211; 502/208; 502/209; 502/210; 423/299; 585/734
[58] Field of Search ................... 502/208, 209, 502/210, 213, 254, 258, 261, 262, 305, 311, 313, 326; 423/299; 585/734

[56] References Cited

U.S. PATENT DOCUMENTS 4,146,574  3/1979  Onoda et al. ................... 423/299

FOREIGN PATENT DOCUMENTS 720840  2/1965  Canada ................... 260/586
3093765  4/1991  Japan .

Primary Examiner—Glenn Caldarola
Assistant Examiner—Tanaga A. Boozer
Attorney, Agent, or Firm—Armstrong,Westerman,Hattori,McLeland & Naughton

[57] ABSTRACT

A solid acid catalyst for paraffin conversion which consists of an acid salt of a heteropoly acid being represented by the following general formula:

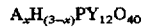

$$A_xH_{(3-x)}PY_{12}O_{40}$$

wherein A represents one ion selected from the group consisting of alkali metal ion and ammonium ion; Y represents at least one atom selected from the group consisting of W and Mo; x represents a number of 2.2 to 2.8, and a metal Group VIII, wherein the acid salt of heteroply acid has been impregnated in the metal of Group VIII, and paraffin conversion process using the same.

3 Claims, No Drawings

SOLID ACID CATALYST FOR PARAFFIN CONVERSION AND PROCESS FOR PARAFFIN CONVERSION USING THE SAME

This application is a continuation-in-part of application Ser. No. 08/215,947 filed Mar. 22, 1994, abandoned.

BACKGROUND OF THE INVENTION

1) Field of the Invention

The present invention relates to a solid acid catalyst for paraffin conversion which is used in petroleum refining and petrochemical industries and a paraffin conversion process using catalyst thereof.

2) Related Prior Art

In petroleum refining and petrochemical industries, conversion reactions of a large number of paraffins have been carried out. Examples includes catalytic cracking, catalytic reforming, hydrocracking, isomerization, alkylation, etc.

Particularly, as a catalyst for conversion carrying out paraffin isomerization reaction and paraffin alkylation reaction, etc., an acid catalyst having strong acidity is required. Hitherto, for these reactions, acid catalysts such as sulfuric acid, hydrogen fluoride, aluminum chloride and antimony trichloride have been used. However, since these catalysts cause metal corrosion, use of expensive materials having corrosion resistance and treatment for anti-corrosion are required. Moreover, with recent tightening of environmental regulations, disposal of waste catalysts is costly and severely regulated. Furthermore, there has been the problem that it is difficult to separate the catalyst from reactants.

Moreover, in paraffin isomerization, there has been applied a process which comprises carrying out isomerization in the presence of a catalyst treated with a solid acid containing a noble metal including Pt and a compound containing a halogen, and hydrogen. However, since the catalyst is very readily deactivated with water, there has been the problem that a higher cost is required for removal of water in a starting material.

JP-A-5-58921 discloses a process for producing a butyl group-substituted aromatic compound which comprises reacting ethylene with an aromatic compound in the presence of a catalyst containing an alkali metal salt of a heteropoly acid and a metal of Group VIII. However, JP-A-5-58921 disclose no paraffin conversion.

Canadian Patent No. 720,840 discloses a catalyst composition comprising a heteropoly acid and a Group VIII. Moreover, Canadian Patent No.720,840 describes that it is preferred to use the catalyst composition in supported form, i.e. on a carrier.

JP-A-3-93765 discloses a process for producing aromatic urethanes which comprises reacting an aromatic nitro compound with a hydroxy group-containing compound(s) and carbon monoxide in the presence of the catalyst being composed of (A) palladium or a compound(s) thereof and (B) a molybdenum-containing heteroply acid(s) or salt(s) thereof. Each of (A) and (B) components in the catalyst in JP-A-3-93765 is a separate component.

Neither the catalyst in Canadian Patent No. 720,840 nor that in JP-A-3-93765 provide sufficient activity for an acid catalyzed reaction, particularly for paraffin conversion reaction.

SUMMARY OF THE INVENTION

The object of the present invention is to solve the above-mentioned prior problems and provide a solid acid catalyst for paraffin conversion which causes no corrosion and is readily separated from reactants and furthermore has high activity for an acid catalyzed reaction.

As a result of an extensive study to solve the above-mentioned problems, the present inventors have found that a catalyst comprising specific components, particularly a catalyst consisting of a specific composition of components causes no corrosion and is readily separated from reactants and furthermore has high activity for a solid acid catalyzed reaction for paraffin conversion, and has established the present invention.

That is, the present invention provides a solid acid catalyst for paraffin conversion which consists of an acid salt of a heteropoly acid being represented by the following general formula (1):

$$A_xH_{(3-x)}PY_{12}O_{40} \qquad (1)$$

wherein A represents one ion selected from the group consisting of alkali metal ion and ammonium ion ; Y represents at least one atom selected from the group consisting of W and Mo; x represents a number of 2.2 to 2.8, and a metal of Group VIII, wherein the acid salt of heteropoly acid has been impregnated in the metal of Group VIII.

The present invention provides also a paraffin conversion process which comprises carrying out paraffin conversion in the presence of a solid acid catalyst consisting of an acid salt of a heteropoly acid being represented by the following general formula (1):

$$A_xH_{(3-x)}PY_{12}O_{40} \qquad (1)$$

wherein A represents one ion selected from the group consisting of alkali metal ion and ammonium ion; Y represents at least one atom selected from the group consisting of W and Mo; x represents a number of 2.2 to 2.8, and a metal Group VIII, wherein the acid salt of heteopoly acid has been impregnated in the metal of Group VIII.

DETAILED DESCRIPTION OF THE INVENTION

The present invention will be described in detail below.

The term "acid salt of heteropoly acid" means a substance wherein one or more hydrogen ions in a heteropoly acid has been replaced by other cations.

The term "heteropoly acid" means a general term of the acid wherein two or more species of inorganic oxyacids have been condensed. Although a heteropoly acid being used in the present invention is not limited to a specific structure, the heteropoly acid being represented by the general formula (1) is preferable.

$$A_xH_{(3-x)}PY_{12}O_{40} \qquad (1)$$

wherein A represents one ion selected from the group consisting of alkali metal ion and ammonium ion ; Y represents at least one atom selected from the group consisting of W and Mo; x represents a number of 2.2 to 2.8, and a metal Group VIII, wherein the acid salt of heteroply acid has been impregnated in the metal of Group VIII.

The acid salt of a heteropoly acid being represented by the general formula (1) contains phosphorus. Y in the general formula (1) is preferably least one atom selected from the group consisting of W and Mo.

The solid acid catalyst being used in the present invention consists of an acid salt of the heteropoly acid wherein one or more of hydrogen ions is replaced by other cations and a metal of Group VIII. As replacing cations, alkali metal ions and ammonium ions are preferable. Among them, $K^+$, $R^+$, $Cs^+$ and $NH_4^+$ are more preferable. Particularly, $Cs^+$ is most preferable.

In the preparation of the solid acid catalyst according to the present invention, a salt of the cations reacts with a heteropoly acid. As the salts being used in the preparation, carbonates, nitrates, sulfates, chlorides, acetates and oxalates are preferable. Particularly, carbonates are more preferable.

x in the acid salt of heteropoly acid being represented by the general formula (1) is preferably 2.05 to 2.95, more preferably 2.1 to 2.9, most preferably 2.2 to 2.8. When x is below 2.05, activity is low and hydrocracking which is generally an unfavorable side reaction predominantly occurs. Moreover, when x exceeds 2.95, hydrocracking which is generally an unfavorable side reaction predominantly occurs.

The metal of Group VIII being used in the present invention is one metal belonging to Group VIII of the Periodic Table. Among the metals, Ru, Rh, Pd, Os, Ir or Pt is preferable. Particularly, Pd or Pt is more preferable. As the salts employed in the preparation of the solid acid catalyst according to the present invention, optional salts which are ordinarily available may be employed. For example, halogenides, nitrates, sulfates, acetates, cyanides, acetylacetonates, amine amine complexes and carbonyl complexes and the like are preferable. Preferable examples include, platinum chloride, platinum iodide, chloroplatinic acid, potassium chloroplatinate, $Pt(NH_3)_4Cl_2$, palladium acetate, palladium chloride, palladium nitrate, palladium acetylacetonate, rhodium acetate, rhodium chloride, rhodium nitrate, ruthenium chloride, osmium chloride and iridium chloride.

The content of the metal of Group VIII in the present invention is preferably 0.05 to 30% by weight, more preferably 0.2 to 10% by weight, most preferably 0.5 to 5% by weight, based on the total amount of a catalyst.

In the present invention, the acid salt of a heteropoly acid has been impregnated in the metal of Group VIII. The method for conducting impregnation is not particularly limited. For example, an aqueous solution containing a metal salt of Group VIII is dropped in an aqueous solution of a heteropoly acid with stirring at a temperature of about 40° to 70° C. After standing, an aqueous alkali metal solution or an aqueous ammonium solution is gradually dropped. Then, water is evaporated by drying.

Further, another method for conducting impregnation comprises preparing an alkali or ammonium salt of a heteropoly acid, then impregnating the salt in an aqueous solution of a metallic compound of Group VIII, and removing water.

Thus, the acid salt of a heteropoly acid is impregnated in the metal of Group VIII. Further, it is assumed that probably the acid salt of a heteropoly acid is partially chemical-combined with the metal of Group The solid acid catalyst according to the present invention is used alone without being supported on a carrier. When the solid acid catalyst is supported on a carrier, activity for an acid catalyzed reaction, particularly for paraffin conversion reaction deteriorates.

It is desirable that pretreatment is carried out in an oxidizing atmosphere for the solid acid catalyst according to the present invention. Example of the pretreatment in an oxidizing atmosphere includes treatment in oxygen gas and treatment in air. By carrying out the pretreatment in an oxidizing atmosphere, activity and selectivity including paraffin isomerization reaction further increase. Before or after the pretreatment in an oxidizing atmosphere, treatment in nitrogen gas or an inert gas may be carried out. It is desirable that pretreatment in a reducing atmosphere including treatment in hydrogen is carried out before pretreatment in an oxidizing atmosphere. When pretreatment in a reducing atmosphere is carried out after pretreatment in an oxidizing atmosphere, significant advantages being provided by the pretreatment in an oxidizing atmosphere tend to decrease.

The solid acid catalyst according to the present invention is effective in paraffin conversion reactions. Examples include catalytic cracking, catalytic reforming, hydrocracking, isomerization, alkylation, etc. Particularly, the solid acid catalyst according to the present invention is effective in paraffin isomerization reactions and paraffin alkylation reactions.

As paraffins being used in the present invention, a paraffin having 4 to 12 carbon atoms is preferable. Particularly, a paraffin having 4 to 8 carbon atoms is more preferable. Preferable example for use includes butane, pentane, hexane, heptane and octane. The paraffin can be used alone or in a mixture of paraffins. Moreover, a light naphtha containing 50% by weight or above of paraffins also can be used. Particularly, butane, pentane and hexane are more preferable.

Paraffin isomerization reaction is described in detail below.

Paraffin isomerization reaction can be carried out either batchwise or by one-path flow. Batchwise, the amount of the solid acid catalyst being used is preferably 0.1 to 10% by weight, more preferably 1 to 5% by weight, based on a starting material.

The reaction temperature is preferably 70° to 400° C., more preferably 100° to 350° C. The reaction pressure may be in atmospheric pressure or an applied pressure. In the case of one-path flow, liquid hour space velocity (LHSV) is preferably 0.1 to 10 $hr^{-1}$, more preferably 0.3 to $4^{-1}$.

The solid acid catalyst according to the present invention is preferably used in the presence of hydrogen. By using the solid acid catalyst in the presence of hydrogen, activity and selectivity in isomerization further increases and catalyst life tends to be extended. The concentration of hydrogen in reaction gases is preferably 0.1 to 99% by volume, more preferably 0.5 to 80% by volume, most preferably 1 to 60% by volume.

PREFERRED EMBODIMENTS OF THE INVENTION

The present invention will be described in detail below, referring to Examples and Comparative Examples, which are not limitative of the present invention.

EXAMPLE 1

10.96 g of $H_3PW_{12}O_{40} \cdot 6H_2O$ was mixed with water to obtain an aqueous solution of 0.08 mol/l and then a solution containing 0.3024 g of $Pt(NH_3)_4Cl_2$ dissolved in 10 ml of water was gradually dropped therein while stirring at 50° C. After standing for 30 minutes, an aqueous cesium carbonate solution of 0.125 mol/l was gradually dropped therein. After standing at a room temperature over night, water was evaporated by drying with a rotary evaporator to obtain $Pt\text{-}Cs_{2.5}H_{0.5}PW_{12}O_{40}$. The catalyst obtained thus contained 1.5 wt % of Pt and had a surface area of 100 $m^2/g$.

Butane isomerization reaction was carried out using a fixed bed-one path flow reactor. 1 g of $Pt\text{-}Cs_{2.5}H_{0.1}PW_{12}O_{40}$ was charged to the reactor. After pretreatment had been carried out at 300° C. for one hour in oxygen gas and for one hour in nitrogen gas, reaction was carried out at a reaction temperature of 300° C. under 1 atm while flowing a mixed gas of butane 5% by volume, $H_2$ 50% by volume and $N_2$ 45% volume at a flow rate of 10 ml/min. The conversion rate at 5 hours after starting of reaction, the selectivity to isobutane and the production rate of isobutane are shown in table 1. Products other than isobutane from the isomerization reaction were mostly methane, ethane and propane.

EXAMPLE 2

Butane isomerization reaction was carried out in the same manner as in Example 1 except that a reaction gas of butane 5 % by volume, $H_2$ 5% by volume, $N_2$ 45% by volume and He 45% by volume was used. The result is shown in table 1.

EXAMPLE 3

10.86 g of $H_3PW_{12}O_{40} \cdot 6H_2O$ was mixed with water to obtain an aqueous solution of 0.08 mol/l and then a solution containing 0.4233 g of $Pd(NO_3)_2 \cdot 1.5 H_2O$ dissolved in 5 ml of water was gradually dropped therein while stirring at 50° C. After standing for 30 minutes, an aqueous caesium carbonate solution of 0.125 mol/l was gradually dropped therein. After standing at a room temperature over night, water was evaporated by drying with a rotary evaporator to obtain $Pd-Cs_{2.5}H_{0.5}PW_{12}O_{40}$. The catalyst obtained thus contained 1.5 wt % of Pd and had a surface area of 113 $m^2g$.

Butane isomerization reaction was carried out in the same manner as in Example 1 except that 1 g of $Pd-Cs_{2.5}H_{0.5}PW_{12}O_{40}$ was used instead of 1 g of $Pt-Cs_{2.5}H_{0.5}PW_{12}O_{40}$. The result is shown in table 1.

EXAMPLE 4

Butane isomerization reaction was carried out in the same manner as in Example 3 except that a reaction gas of butane 5% by volume, $H_2$ 5% by volume, $N_2$ 45% by volume and He 45% by volume was used. The result is shown in table 1.

COMPARATIVE EXAMPLE 1

8.562 g of $H_3PW_{12}O_{40} \cdot 6H_2O$ was mixed with water to obtain an aqueous solution of 0.08 mol/l and then a solution containing 0.2118 g of $Pt(NH_3)_4Cl_2$ disolved in 5 ml of water was gradually dropped therein while stirring at 50° C. After standing at a room temperature over night, water was evaporated by drying with a rotary evaporator to obtain $Pt-H_3PW_{12}O_{40}$. The catalyst obtained thus contained 1.5 wt % of Pt and had a surface area of 9.7 $m^2/g$.

Butane isomerization reaction was carried out in the same manner as in Example 1 except that 1 g of $Pt-H_3PW_{12}O_{40}$ was used instead of 1 g of $Pt-Cs_{2.5}H_{0.5}PW_{12}O_{40}$. The result is shown in table 1.

COMPARATIVE EXAMPLE 2.

8.203 g of $H_3PW_{12}O_{40} \cdot 6H_2O$ was mixed with water to obtain an aqueous solution of 0.08 mol/l and then a solution containing 0.2866 g of $Pd(NO_3)_2 \cdot 1.5H_2O$ dissolved in 5 ml of water was gradually dropped therein while stirring at 50° C. After standing at a room temperature over night, water was evaporated by drying with a rotary evaporator to obtain $Pd-H_3PW_{12}O_{40}$. The catalyst obtained thus contained 1.5 wt % of Pd and had a surface area of 8.6 $m^2/g$.

Butane isomerization reaction was carried out in the same manner as in Example 1 except that 1 g of $Pd-H_3PW_{12}O_{40}$ was used instead of 1 g of $Pt-Cs_{2.5}H_{0.5}PW_{12}O_{40}$. The result is shown in table 1.

COMPARATIVE EXAMPLE 3

Butane isomerization reaction was carried out in the same manner as in Example 1 except that 0.5 g of catalyst supported by 1 wt % of Pt on H-ZSM-5 (25H, produced by Mobil Catalysts Corporation of Japan) was used instead of $Pt-Cs_{2.5}H_{0.5}PW_{12}O_{40}$. The result is shown in table 1.

COMPARATIVE EXAMPLE 4

Butane isomerization reaction was carried out in the same manner as in Example 1 except that 1 wt % of $Pt/Al_2O_3$ (produced by N.E.Chemcat Co.) was used instead of $Pt-Cs_{2.5}H_{0.5}PW_{12}O_{40}$. The result is shown in table 1.

COMPARATIVE EXAMPLE 5

$Pt-CS_3PW_{12}O_{40}$ was prepared in the same manner as in Example 1 except that the amount of the aqueous cesium carbonate solution was changed and as the pretreatment of catalyst, oxygen gas treatment was carried out after nitrogen gas treatment.

Butane isomerization reaction was carried out in the same manner as in Example 1 except that 1 g of $Pt-Cs_3PW_{12}O_{40}$ was used instead of 1 g of $Pt-CS_{2.5}H_{0.5}PW_{12}O_{40}$. The result is shown in table 1.

COMPARATIVE EXAMPLE 6

Butane isomerization reaction was carried out in the same manner as in Example 1 except that as reaction gases, butane 5% by volume and $N_2$ 95% by volume were used. The result is shown in table 1.

COMPARATIVE EXAMPLE 7

Butane isomerization reaction was carried out in the same manner as Example 3 except that as reaction gases, butane 5% by volume and $N_2$ 95% by volume were used. The result is shown in table 1.

COMPARATIVE EXAMPLE 8

$H_3PW_{12}O_{40} \cdot 6H_2O$ was mixed with water to obtain an aqueous solution of 0.08 mol/l and then an aqueous cesium carbonate solution of 0.125 mol/l was gradually dropped therein while stirring. After standing over night, water was evaporated by drying with a rotary evaporator to obtain $Cs_{2.5}H_{0.5}PW_{12}O_{40}$.

Butane isomerization reaction was carried out in the same manner as in Example 1 except that 1 g of $CS_{2.5}H_{0.5}PW_{12}O_{40}$ was used instead of 1 g of $Pt-Cs_{2.5}H_{0.5}PW_{12}O_{40}$. The result is shown in table 1.

COMPARATIVE EXAMPLE 9

Ammonia water was added to an aqueous solution of zirconium oxychloride to produce a precipitate. After filtration and drying of the precipitate, 0.05 mol/l of sulfuric acid was poured and dried. An aqueous solution of chloroplatinic acid was impregnated therein and then dried and calcined to obtain a Pt-supported-sulfuric acid treated $ZrO_2$ catalyst (hereinafter, referred to $Pt-SO_4^{2-}/ZrO_2$).

Butane isomerization reaction was carried out in the same manner as in Example 1 except that 1 g of $Pt-SO_4^{2-}/ZrO_2$ was used instead of 1 g of $Pt-Cs_{2.5}H_{0.5}PW_{12}O_{40}$. The result is shown in table 1.

COMPARATIVE EXAMPLE 10

1 g of $Cs_{2.5}H_{0.5}PW_{12}O_{40}$ prepared in comparative Example 8 was mixed with 0.5 g a catalyst( produced by N.E. Chemcat Co.) supported 3 wt % of Pt on silica to obtain a catalyst.

Butane isomerization reaction was carried out in the same manner as in Example 1 except that 1 g of the thus obtained catalyst was used instead of 1 g of $Pt-Cs_{2.5}H_{0.5}PW_{12}O_{40}$. The result is shown in table 1.

COMPARATIVE EXAMPLE 11

2 g of $Cs_{2.5}H_{0.5}PW_{12}O_{40}$ prepared in comparative Example 8 was sufficiently mixed with 0.055 g of $Pt(NH_3)_4Cl_2.H_2O$(Assay Pt 55%) by grinding down with a mortar. The thus obtained mixture, i.e., catalyst was charged into the reactor. This handling was carried out in dried nitrogen in order to prevent absorption of moisture.

Isomerization reaction was carried out in the same manner as in Example 1 except that 1 g of the thus obtained catalyst was used instead of 1 g of $Pt-Cs_{2.5}H_{0.5}PW_{12}O_{40}$. The result is shown in table 1.

EXAMPLE 5

Pentane isomerization reaction was carried out using a fixed bed-high pressure-one path flow reactor. 1 g of $Pt-Cs_{2.5}H_{0.5}PW_{12}O_{40}$ obtained in Example 1 was charged to the reactor. After pretreatment had been carried out at 300° C. for one hour in oxygen gas and for one hour in nitrogen gas, the reaction was carried out at a reaction temperature of 170° C. under total pressure of 20 kg/cm² in $H_2$/pentane ratio of 3/2 at WHSV of 4 $h^{-1}$. The conversion rate at 5 hours after starting of reaction and the isopentane selectivity are shown in table 2. Products other than isopentane from the isomerization reaction were mostly methane, ethane, propane and butane. The result is shown in table 2.

EXAMPLE 6

Pentane isomerization reaction was carried out in the same manner as in Example 5 except that 1 g of $Pd-Cs_{2.5}H_{0.5}PW_{12}O_{40}$ obtained in Example 3 was used instead of 1 g of $Pt-Cs_{2.5}H_{0.5}PW_{12}O_{40}$. The result is shown in table 2.

EXAMPLE 7

$Pt-Cs_{2.4}H_{0.6}PW_{12}O_{40}$ was prepared in the same as in Example 1 except that the amount of the aqueous solution of cesium carbonate was changed.

Pentane isomerization reaction was carried out in the same manner as in Example 5 except that 1 g of $Pt-Cs_{2.4}H_{0.6}PW_{12}O_{40}$ was used instead of 1 g of $Pt-Cs_{2.5}H_{0.5}PW_{12}O_{40}$. The result is shown in table 2.

EXAMPLE 8

$Pt-Cs_{2.6}H_{0.4}PW_{12}O_{40}$ was prepared in the same manner as in Example 1 except that the amount of the aqueous solution of caesium carbonate was changed.

Pentane isomerization reaction was carried out in the same manner as in Example 5 except that 1 g of $Pt-Cs_{2.6}H_{0.4}PW_{12}O_{40}$ was used instead of 1 g of $Pt-Cs_{2.5}H_{0.5}PW_{12}O_{40}$. The result is shown in table 2.

COMPARATIVE EXAMPLE 12

$Pt-CsH_2PW_{12}O_{40}$ was prepared in the same manner as in Example 1 except that the amount of the aqueous solution of cesium carbonate was changed.

Pentane isomerization reaction was carried out in the same manner as in Example 5 except that 1 g of $Pt-CsH_2PW_{12}O_{40}$ was used instead of 1 g of $Pt-Cs_{2.5}H_{0.5}PW_{12}O_{40}$. The result is shown in table 2.

COMPARATIVE EXAMPLE 13

$Pt-Cs_2HPW_{12}O_{40}$ was prepared in the same manner as in Example 1 except that the amount of the aqueous solution of cesium carbonate was changed.

Pentane isomerization reaction was carried out in the same manner as in Example 5 except that 1 g of $Pt-Cs_2HPW_{12}O_{40}$ was used instead of 1 g of $Pt-Cs_{2.5}H_{0.5}PW_{12}O_{40}$. The result is shown in table 2.

COMPARATIVE EXAMPLE 14

Pentane isomerization reaction was carried out in the same manner as in Example 5 except that 1 g of $Pt-Cs_3PW_{12}O_{40}$ obtained in Comparative Example 5 was used instead of 1 g of $Pt-Cs_{2.5}H_{0.5}PW_{12}O_{40}$. The result is shown in table 2.

COMPARATIVE EXAMPLE 15

Pentane isomerization reaction was carried out in the same manner as in Example 5 except that 1 g of $Pt-SO_4^{2-}/ZrO_2$ obtained in Comparative Example 9 was used instead of 1 g of $Pt-Cs_{2.5}H_{0.5}PW_{12}O_{40}$. The result is shown in table 2.

As clear from tables 1 and 2, the solid acid catalyst according to the present invention has a high selectivity for isobutane and isopentane and a high conversion rate in the conversion reaction of butane and pentane which is a paraffin conversion reaction.

Moreover, the solid acid catalyst according to present invention is non-corrosive and readily separated from reactants.

Thus, the solid acid catalyst according to the present invention is an excellent catalyst having high activity for paraffin conversion reaction.

TABLE 1

| | | Butane isomerization reaction | | | |
|---|---|---|---|---|---|
| Example or Comp. Ex. | species of catalyst | $H_2$ concentration (a) | conversion (b) | selectivity (c) | production rate (d) |
| Example 1 | $Pt—Cs_{2.5}H_{0.5}PW_{12}O_{40}$ | 50 | 24.6 | 93.8 | 7.9 |
| Example 2 | $Pt—Cs_{2.5}H_{0.5}PW_{12}O_{40}$ | 5 | 20.5 | 88.2 | 6.2 |
| Example 3 | $Pd—Cs_{2.5}H_{0.5}PW_{12}O_{40}$ | 50 | 33.6 | 95.5 | 10.9 |
| Example 4 | $Pd—Cs_{2.5}H_{0.5}PW_{12}O_{40}$ | 5 | 12.9 | 78.3 | 3.4 |
| Comp. Ex. 1 | $Pt—H_3PW_{12}O_{40}$ | 50 | 4.2 | 95.4 | 1.3 |

TABLE 1-continued

Butane isomerization reaction

| Example or Comp. Ex. | species of catalyst | $H_2$ concentration (a) | conversion (b) | selectivity (c) | production rate (d) |
|---|---|---|---|---|---|
| Comp. Ex. 2 | Pd—$H_3PW_{12}O_{40}$ | 50 | 7.3 | 86.2 | 2.1 |
| Comp. Ex. 3 | Pt—H—ZSM—5 | 50 | 51.0 | 34.0 | 11.8 |
| Comp. Ex. 4 | Pt—$Al_2O_3$ | 50 | 75.0 | 8.0 | 2.0 |
| Comp. Ex. 5 | Pt—$Cs_3PW_{12}O_{40}$ | 50 | 31.0 | 2.5 | 0.3 |
| Comp. Ex. 6 | Pt—$Cs_{2.5}H_{0.5}PW_{12}O_{40}$ | 0 | 2.5 | 25.9 | 0.2 |
| Comp. Ex. 7 | Pd—$Cs_{2.5}H_{0.5}PW_{12}O_{40}$ | 0 | 2.3 | 12.5 | 0.09 |
| Comp. Ex. 8 | $Cs_{2.5}H_{0.5}PW_{12}O_{40}$ | 50 | 5.5 | 87.3 | 1.6 |
| Comp. Ex. 9 | Pt—$SO_4^{2-}/ZrO_2$ | 50 | 65.0 | 47.3 | 10.4 |
| Comp. Ex. 10 | $Cs_{2.5}H_{0.5}PW_{12}O_{40}$+Pt/$SiO_2$ | 50 | 61.1 | 44.2 | 6.1 |
| Comp. Ex. 11 | $Cs_{2.5}H_{0.5}PW_{12}O_{40}$+Pt | 50 | 6.1 | 78.7 | 1.6 |

(a) $H_2$ concentration in reaction gases, Vol %
(b) conversion of butane, mol %
(c) selectivity to isobutane, mol %
(d) production rate of isobutane, $10^{-8}$ mol/g · s

TABLE 2

Pentane isomerization reaction

| Example or Comp. Ex. | species of catalyst | conversion (a) | selectivity (b) |
|---|---|---|---|
| Example 5 | Pt—$Cs_{2.5}H_{0.5}PW_{12}O_{40}$ | 64 | 100 |
| Example 6 | Pd—$Cs_{2.5}H_{0.5}PW_{12}O_{40}$ | 65 | 100 |
| Example 7 | Pt—$Cs_{2.4}H_{0.6}PW_{12}O_{40}$ | 60 | 98 |
| Example 8 | Pt—$Cs_{2.6}H_{0.4}PW_{12}O_{40}$ | 59 | 99 |
| Comp. Ex. 12 | Pt—$CsH_2PW_{12}O_{40}$ | 5 | 8 |
| Comp. Ex. 13 | Pt—$Cs_2HPW_{12}O_{40}$ | 7 | 6 |
| Comp. Ex. 14 | Pt—$Cs_3PW_{12}O_{40}$ | 71 | 4 |
| Comp. Ex. 15 | Pt—$SO_4^{2-}/ZrO_2$ | 51 | 90 |

(a) conversion of pentane, mol %
(b) selectivity to isopentane, mol %

What is claimed is:

1. A solid acid catalyst for paraffin conversion which consists of an acid salt of a heteropoly acid being represented by the following general formula (1):

$$A_xH_{(3-x)}PY_{12}O_{40} \qquad (1)$$

wherein A represents one ion selected from the group consisting of alkali metal ion and ammonium ion; Y represents at least one atom selected from the group consisting of W and Mo; x represents a number of 2.2 to 2.8, and a metal Group VIII, wherein the acid salt of heteropoly acid has been impregnated in the metal of Group VIII.

2. A solid acid catalyst according to claim 1, wherein the metal of Group VIII is one metal selected from the group consisting of Ru, Rh, Pd, Os, Ir and Pt.

3. A solid acid catalyst for paraffin conversion which consists of an acid salt of a heteropoly acid being represented by the following general formula (1):

$$A_xH_{(3-x)}PY_{12}O_{40} \qquad (1)$$

wherein A represents one ion selected from the group consisting of alkali metal ion and ammonium ion; Y represents at least one atom selected from the group consisting of W and Mo; x represents a number of 2.2 to 2.8, and a metal Group VIII, wherein the acid salt of heteroply acid has been impregnated in the metal of Group VIII and pretreatment has been carried out on the solid acid catalyst in an oxidizing atomosphere.

* * * * *